March 19, 1974     L. J. VON GUNTEN     3,798,110
ROTARY SEALING ROLLER
Filed Dec. 15, 1971
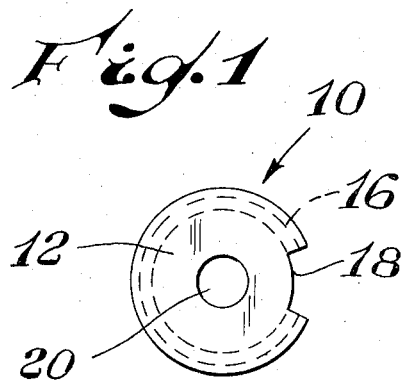
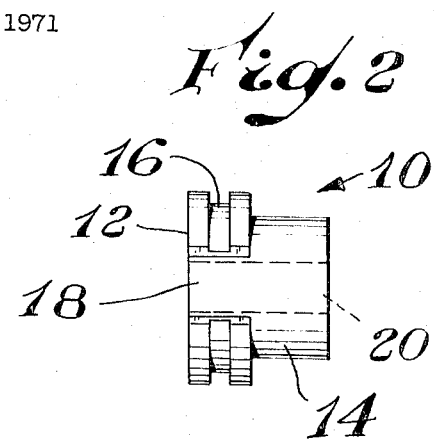
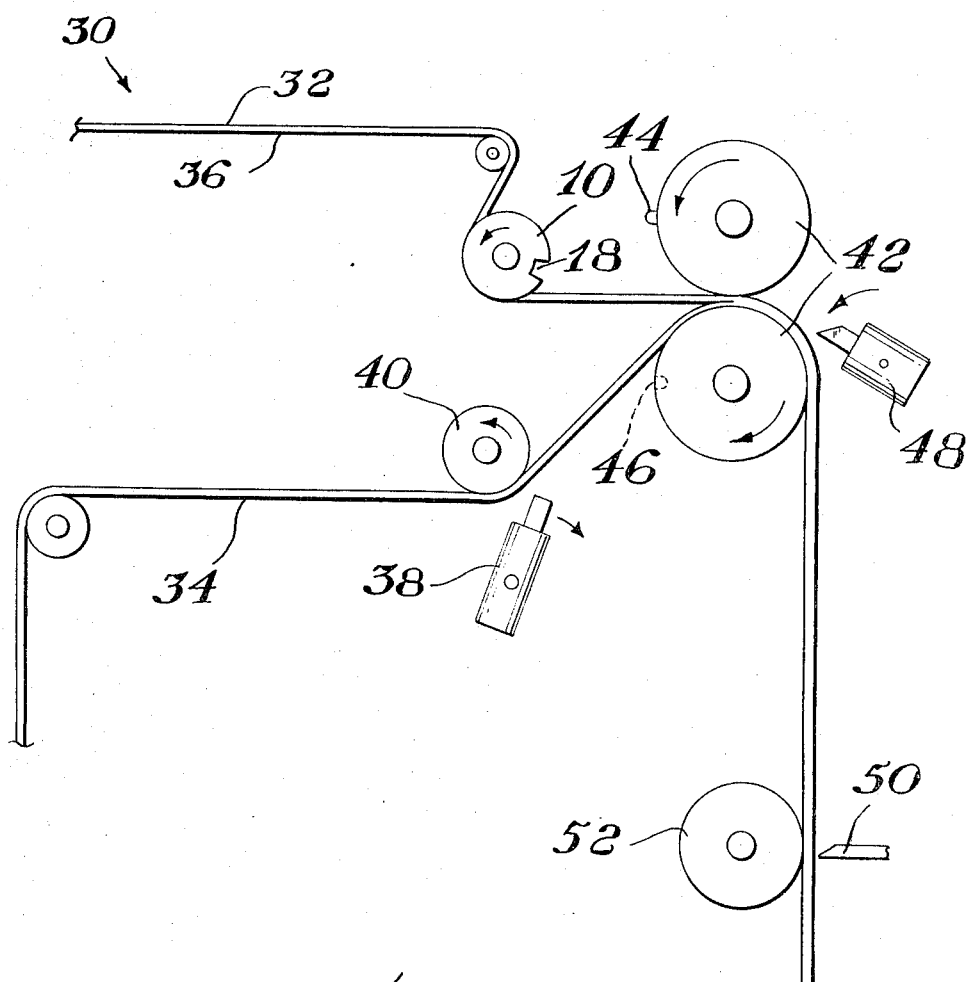

United States Patent Office 3,798,110
Patented Mar. 19, 1974

3,798,110
ROTARY SEALING ROLLER
Leo J. Von Gunten, Akron, Ohio, assignor to The Dow Chemical Company, Midland, Mich.
Filed Dec. 15, 1971, Ser. No. 208,228
Int. Cl. B21b 27/00; B32b 31/00
U.S. Cl. 156—582
2 Claims

ABSTRACT OF THE DISCLOSURE

A rotary sealing roller employed in wrapping apparatus, said roller providing heat softening of a wax or adhesive on a tear strip ribbon just prior to the same being combined with wrapping material. The roller comprises a thin heated roller having a groove disposed circumferentially around the outer edge and a recess disposed on the outer periphery thereof. The groove provides straight line lateral alignment of the ribbon on the roller at high speeds. The recess prevents heat softening of the wax or adhesive on the ribbon over a short span of its length disposed adjacent to and overlapping the ends of individual wrappers cut from the wrapping material.

BACKGROUND OF THE INVENTION (1) Field of the invention

This invention relates to wrapping apparatus used to form flexible films or other wrapping materials into individual wrappers which are then employed in overwrap packaging, with particular reference to a sealing roller used to heat soften a wax or adhesive on a tear strip ribbon before the same is adhered to wrapping material.

(2) Description of the prior art

Paper, metal foil, plastic film and various laminates thereof with good gas and water vapor barrier properties have long been used as an overwrap for perishable products such as cigarettes, candy, chocolates, cough drops and the like. These wrappers are often difficult and annoying to remove. To overcome this problem, a tear strip which is considerably stronger than the wrapping material is adhered to the same, thereby facilitating easy opening and removal of products wrapped therewith. A common type of wrapper with a tear strip and a method most frequently used to making the same is illustrated in Pat. No. 2,334,381 by Wilhelm B. Bronander.

As noted in Pat. No. 2,334,381, the tear strip is adhered to the wrapping material by applying a solvent or solvent based adhesive to the tear strip prior to combining it with the wrapping material. Since most flexible wrapping materials and tear strip ribbons commonly used are formed from cellulose which is very soluble in many ordinary organic solvents, a satisfactory adhesion between the tear strip ribbon and the wrapping material can be achieved without resorting to more elaborate adhesive bonding means. However, with the advent of new wrapping materials such as polypropylene, solvent adhering systems are unsatisfactory due to a lack of solubility of the wrapping material and tear strip ribbon formed therefrom. To overcome this problem heat sealing waxes or adhesives such as a copolymer of ethylene and vinyl acetate may be applied to the tear strip ribbon to obtain better adhesion with the wrapping material. It is therefore necessary to provide a satisfactory means for heat softening the wax or adhesive prior to combining the tear strip ribbon with the wrapping material.

Accordingly, it is an object of the present invention to provide a new and improved means for heat softening a wax or adhesive applied to a tear strip ribbon just prior to its being adhered to wrapping material. Another object of the present invention is to provide a heated sealing roller for heat softening a wax or adhesive applied to a tear strip ribbon just prior to it being adhered to a wrapping material. Other objects of the present invention will become apparent to persons skilled in the art from the specification, drawings, and claims.

SUMMARY

In general, the present invention provides a heated sealing roller employed in wrapping apparatus. The sealing roller provides heat softening of a wax or adhesive on a tear strip ribbon just prior to the same being combined and securely adhered to wrapping material. During use, the sealing roller would be heated with an electrical resistance heater or other known means.

The sealing roller comprises a thin heated roller having means for maintaining straight line lateral alignment of the tear strip ribbon on the roller at high speeds and means for preventing heat softening of the wax or adhesive over a short span of the length of said ribbon which is disposed adjacent to and overlaps the individual wrappers cut from the combined wrapping material and tear strip ribbon. More specifically, the alignment means and the means for preventing heat softening of the wax or adhesive over a short span of the ribbon could be a groove disposed circumferentially around the outer edge and a recess disposed on the outer periphery cf the thin heated roller. The groove provides straight line lateral alignment of the ribbon on the roller during high speed operation of the same. The recess provides a short span on the outer periphery of the roller over which no heat softening of the wax or adhesive on the ribbon can take place, thereby preventing the ribbon from adhering to the wrapping material over the length of this span. The short length of non-adhering ribbon is registered with the wrapping material such that it falls adjacent to and overlaps individual wrappers cut from the wrapping material. Thus, the non-adhering length of ribbon allows for easy separation of the individual wrappers without tearing and makes it possible to obtain a firm grip on the end of the ribbon with the fingers during opening of a product wrapped on the wrapping apparatus.

BRIEF DESCRIPTION OF THE DRAWINGS

The preferred embodiments of the present invention are shown in the accompanying drawings where like characters of reference designate corresponding materials and parts throughout the several views thereof in which:

FIG. 1 is an elevation view of a sealing roller showing a recess disposed in the outer periphery thereof;

FIG. 2 is a right side elevation view of FIG. 1 showing the recess and a groove disposed circumferentially around the outer edge of the sealing roller; and FIG. 3 is a partial schematic illustration of wrapping apparatus which incorporates the sealing roller as herein described.

DESCRIPTION OF THE PREFERRED EMBODIMENTS

The following description illustrates the manner in which the principles of the invention are applied but are not to be construed as limiting the scope of the invention.

More specifically referring to FIGS. 1 and 2, a sealing roller 10 used to heat soften wax or adhesive on a tear strip ribbon is illustrated. The sealing roller 10 comprises a thin roller 12 having a groove 16 disposed circumferentially around its outer edge, a recess 18 disposed in its outer periphery and a hub 14 securely fixed thereto. The roller 12 and hub 14 have a hole or elongated hollow 20 for receiving a drive shaft, not shown in the drawings. The groove 16 provides straight line lateral alignment of a tear strip ribbon as it passes around the roller 12 at high speeds. The recess 18 prevents heat softening of a wax or adhesive on a tear strip ribbon over a short span of its length which is ultimately disposed adjacent to and overlaps the ends of individual wrappers cut on the wrapping apparatus.

Referring now to FIG. 3, the use of a heated sealing roller 10 in wrapping apparatus 30 is illustrated. The numeral 34 designates a continuous sheet of flexible wrapping material advancing through apparatus 30. The sheet 34 may be ordinary cellophane or other thermoplastic materials such as polypropylene. The sheet 34 advances past a rotary cutter 38 and backup roller 40 where the cutter 38 cuts a substantially H-shaped opening in sheet 34. The H-shaped opening is best shown in FIG. 2 of the previously cited Pat. No. 2,334,381. As sheet 34 advances through apparatus 30, a tear strip ribbon 32 of similar thermoplastic material having one side 36 thereof coated with a heat softening wax or adhesive is simultaneously advanced through apparatus 30. The tear strip ribbon 32 passes over a heated rotary sealing roller 10 where the wax or adhesive on side 36 is softened to a tacky state, except for the length of ribbon 32 excluded by recess 18. The roller 10 is heated with an electrical resistance heater, not shown in the drawings. The tear strip ribbon 32 and the sheet 34 are then immediately passed between the nip of combining rolls 42 where the ribbon 32 is securely adhered to the sheet 34. The tear strip ribbon 32 is positioned so that it overlays the H-shaped opening previously cut in the sheet 34.

The lug 44 and recess 46 on the combining rolls 42 are registered to come together at the point where the H-shaped opening is cut in sheet 34. This insures a clean cut H-shaped opening and a small excess of ribbon 32 at the ends of the individual wrappers cut on apparatus 30 for better gripping thereof with the fingers during opening of a package. Just prior to the combined ribbon 32 and sheet 34 leaving the bottom combining roll 42, the ribbon 32 is cut adjacent the H-shaped opening. The cutting of the ribbon 32 is accomplished without cutting through sheet 34. The final cut in the combined ribbon 32 and sheet 34 is made by cutter 50 in conjunction with backup roller 52. The cut is made from the side of the H-shaped opening to the outside edge of sheet 34 to form individual wrappers. The individual wrappers formed on apparatus 30 are best illustrated by again referring to FIG. 7 of the previously cited Pat. No. 2,334,381.

It is to be understood that the scope of this invention is not limited by the material used to form the rotary sealing roller 10 except that it must be a good heat conducting material. It is also understood that the form of the present invention herein shown and described is to be taken as a preferred example of the same and that various changes in the shape, size and arrangements of parts may be resorted to. Thus, while certain representative embodiments and details have been shown for the purpose of illustrating the invention, it will be apparent to those skilled in the art that various changes and modifications can be made therein without departing from the spirit and scope of the invention.

What is claimed is:

1. A rotary sealing roller employed in wrapping apparatus for heat softening a wax or adhesive on a tear strip ribbon just prior to said ribbon being combined and securely adhered to wrapping material comprising a thin heated roller having means for maintaining straight line lateral alignment of said ribbon on said heated roller at high speeds and means for preventing heat softening of said wax or adhesive over a short span of the length of said ribbon which is disposed adjacent to and overlaps the ends of individual wrappers cut from said combined wrapping material and tear strip ribbon, said means for maintaining straight line lateral alignment of said ribbon being a groove disposed circumferentially around the outer edge of said heated roller, said means for preventing heat softening of said wax or adhesive over a short span of the length of said ribbon being a recess disposed in the outer periphery of said heated roller.

2. The rotary sealing roller of claim 1 wherein said roller is heated with an electrical resistance heater.

References Cited
UNITED STATES PATENTS

| | | | |
|---|---|---|---|
| 3,405,502 | 10/1968 | Badder | 156—583 X |
| 2,624,574 | 1/1953 | Camras | 29—121 A |
| 3,162,545 | 12/1964 | Dearsley | 29—121 R |
| 3,588,978 | 6/1971 | Brafford | 29—121 R |
| 2,729,267 | 1/1956 | Walton | 29—121 R |
| 2,779,851 | 1/1957 | Vogt | 219—244 |

DOUGLAS J. DRUMMOND, Primary Examiner

M. G. WITYSHYN, Assistant Examiner

U.S. Cl. X.R.

29—121 R; 219—469; 156—583